United States Patent Office 2,820,014
Patented Jan. 14, 1958

2,820,014

ESTER LUBRICANTS

James Hartley, Wirral, Thomas Henry Ramsay, Rockferry, and James Donald Shimmin, Little Sutton, England, assignors to Shell Development Company, New York, N. Y., a corporation of Delaware No Drawing. Application May 2, 1955
Serial No. 505,532

Claims priority, application Great Britain May 14, 1954

7 Claims. (Cl. 252—56)

This invention relates to compositions comprising mixtures of certain diesters especially suitable for use as synthetic lubricating oil compositions capable of functioning over a wide temperature range.

Lubricants for use in aircraft and in gas turbines and the like require special properties which are not possessed by conventional lubricants. Thus, they must possess a very high viscosity index in order to provide adequate lubrication over a wide range of temperatures. They must have high oxidation and thermal stability in order that they may retain their useful properties after operation for a long period of time at high temperatures. They must have a low pour point in order that they may function at low temperatures and high flash points to avoid risk of fire at high temperature operation and loss of lubricant by evaporation.

It has already been proposed to use certain diesters derived from diols and polyalkylene glycols. The latter class of lubricants are subject to oxidation in view of the numerous ether linkages present therein. The diesters principally investigated up to the present time have had the general formula

RCOOR'OOCR where R' is an alkylene group proper and each R is an alkyl group. An examination of a number of such diesters has established the following facts:

When both R and R' are straight chain groups, the diesters solidify at comparatively high temperatures and therefore the products are useless for lubrication at low temperatures such as those encountered in high altitude flying and the like. Thus, the diesters formed between hexane-1,6-diol and straight chain fatty acids having from 8 to 14 carbon atoms, have pour points in the order of 0° C. or higher.

Where both R and R' are branched chain groups, the diesters remain liquid at low temperatures, but the viscosity index is too low for adequate lubrication over a wide temperature range. An example of this comprises the diester formed between a mixture of 2,2,4- and 2,4,4-trimethylhexane-1,6-diols and 2-ethylhexoic acid, which has a viscosity index of only 79. Another example comprises the diesters formed between the same mixture of diols and 3,5,5-trimethylhexoic acid, which have viscosity indices in the order of 129.

Where R represents a branched chain group and R' a straight chain group, the diesters remain liquid at low temperatures but the viscosity index is little better than in the latter case. For instance, when the diester is formed between hexane-1,6-diol and 2-ethylhexoic acid, the viscosity index is only 94.

Where R represents a straight chain group and R' a branched chain group, the products tend to solidify at intermediate or undesirably high temperatures, thus making use at the desired low temperatures impossible. Hence, the esters formed between 2,2,4- and 2,4,4-trimethylhexane-1,6-diols with straight chain fatty acids having from 8 to 13 carbon atoms, have pour points above about −50° C., thus making their use at lower temperatures impossible unless further modified.

With the development of the turbojet and turboprop type of aircraft engines, which operate at peak efficiency at extremely high altitudes, there has developed a corresponding need for lubricants which are efficacious at the extremely low temperatures encountered at high altitudes or in frigid areas. These turbine engines must be supplied with a lubricant possessing low viscosities at low temperatures and at the same time having satisfactory lubricating qualities at high temperatures.

The mineral lubricating oils which exhibit satisfactory low temperature viscosities have generally been found to have flash points that are dangerously low and high temperature viscosities that are below those required. In other words, when the mineral oil is thin enough at low temperatures, it is too volatile at higher temperatures, where it is also too thin to possess satisfactory lubricity. It has been found that, generally speaking, additive agents do not satisfactorily furnish the required characteristics.

It has now been discovered that certain blends of particular types of esters to be described hereinafter combine both good low temperature properties with a high viscosity index and are thus superior to the individual esters for use as lubricating oils intended over a wide temperature range.

Now, in accordance with the present invention, it has been found that such lubricating oil compositions comprise as the major lubricating ingredient a mixture of liquid esters, one of which is a diester of a branched chain alkane di-primary diol with a straight chain fatty acid, said fatty acid having between 4 and 18 carbon atoms per molecule, and the other of which is a diester of a straight chain alkane di-primary diol which diol has between 3 and 12 carbon atoms per molecule with a branched chain fatty acid, said fatty acid having between 4 and 18 carbon atoms per molecule, the fatty acid employed in both esters being saturated and the mol ratio of the first diester to the second diester being between about 65:35 and about 2:98, preferably between 1:1 and 1:4. If a mixture contains a plurality of esters of the first named type or a plurality of the second named type, then the total quantity of esters of each type is taken as the basis for working out the aforementioned mol ratio.

Typical saturated branched chain primary diols from which the first named diester may be formed are 2-methyl-, 2,2-dimethyl-, 2-methyl-2-ethyl, or 2,2-diethyl-propane-1,3-diol, 2-ethylbutane-1,4-diol, 2- or 3-ethylpentane-1,5-diol, 2,3-, 2,4-, 2,5-, 2,2- or 3,3-dimethylhexane-1,6-diol, 2,2,4- or 2,4,4-trimethylhexane-1,6-diol, 2-methyl-3-ethyl- and 2-ethyl-3-methyl- or 3,3-diethylheptane-1,7-diol; 3,5,5-, 3,5,7-, 4,6,8-, 4,4,8-, 5,5,8-trimethyldecane-1,10-diol; 4,4-dipropyldodecane-1,12-diol; 2,3-diethyl-6,6-dimethyloctane-1,8-diol; 3-butylpentane-1,5-diol; 2,2,3- or 2,2,4-trimethylpentane-1,5-diol; 3,5,5- or 2,3,5-trimethylheptane-1,7-diol. The preferred branched chain alkane primary diols are those having between about 8 and 13 carbon atoms per molecule.

These diols are esterified on both hydroxyl groups by a straight chain fatty acid having at least 4 carbon atoms in the molecule, such as valeric, caproic, heptoic, caprylic, pelargonic, capric, undecylic, lauric, tridecylic, myristic, palmitic, stearic and arachidic acids. The esters may be derived from a mixture of the branched chain diols or from a mixture of the straight chain fatty acids. The preferred straight chain fatty acids are those having between 6 and 18 carbon atoms in the molecule. Mixtures of predominantly straight chain fatty acids suitable for use in forming diesters with branched chain diols for use in this invention, may conveniently be made by cracking paraffin wax, isolating a mixture of olefins of a suitable molecular weight range, for example a mixture of olefins containing 8 to 10, 9 to 14 or 11 to 14 carbon atoms in the molecules, sulfating the mixture to form the corresponding secondary alkyl hydrogen sulfates, hydrolyzing to form the corresponding secondary alcohols and fusing these alcohols with caustic alkali to form a mixture of predominantly straight chain fatty acids.

Typical examples of suitable esters of the first type are 2,4,4-trimethylhexane-1,6-diol dicaproate or dicaprylate, the diesters derived from a mixture of 2,2,4- and 2,4,4-trimethylhexane-1,6-diol and a mixture of straight chain fatty acids containing from 8 to 13 or from 10 to 13 carbon atoms in the molecule, 2,5-dimethylhexane-1,6-diol dicaproate, 3,3-dimethylhexane-1,6-diol diheptoate and 3,3-diethylheptane-1,7-diol divalerate; 2,3,4-trimethylpentane-1,5-diol dipelargonate, 2,6-dimethyloctane-1,8-diol dimyristate, 3-propyl-nonane-1,9-diol dibutyrate, 2-butylpropane-1,3-diol dilaurate, 2,2-dimethyl-3-propyl-butane-1,4-diol dipalmitate, and 3,3,4-triethylpentane-1,5-diol dinonoate.

Typical saturated straight chain di-primary diols from which the second type of ester may be formed are propane-1,3-diol, butane-1,4-diol, pentane-1,5-diol, hexane-1,6-diol, heptane-1,7-diol, octane-1,8-diol, nonane-1,9-diol, decane-1,10-diol and dedecane-1,12-diol. Similarly the polyalkylene glycols, such as dithylene, triethylene or tetraethylene glycol and the dipropylene, dibutylene, dihexylene and trihexylene glycols in which the alkylene groups are straight chain groups, may be used. The preferred straight chain di-primary diols are those having between 5 and 12 carbon atoms in the molecule.

The afore-mentioned diols are esterified with branched chain fatty acids having at least 4 carbon atoms in the molecule such as 2-, 3- or 4-methyl-valeric acid, 2-ethyl-valeric acid, 2-, 3-, 4- or 5-methyl-caproic acid, 2-ethyl-caproic acid, 4-methyl-2-ethylcaproic acid, 2-, 3-, 4-, 5- or 6-methylcaprylic acid, 2-, 3-, 4-, 5- or 8-methyl-pelargonic acid, 3-, 4- or 8-methylcapric acid, 2-methyl-lauric acid, isomyristic acid, 2-methylpalmitic acid, 2-methylstearic acid, 2,2-, 2,3- or 3,3-dimethylbutyric acid, 2,5-dimethylcaproic acid and 3,5,5-trimethylcaproic acid. These acids may be used as single pure acids or as mixtures. Many of these acids are obtainable by oxidation of aldehydes produced by the Oxo process from olefins, carbon monoxide and hydrogen in the presence of a cobalt catalyst. Preferably branched chain fatty acids having between 6 and 18 carbon atoms in the molecule are used, such as 2-, 3- or 4-isopropyl valeric acid, 3-, 4- or 5-isobutyl caproic acid, 2,2-dimethyl-3-ethyl caprylic acid, and 2,3-diethyl butyric acid.

Typical examples of suitable esters of the second type are ethylene or propylene glycol di(3,5,5-trimethylhexoate), hexane-1,6-diol di(2-ethylhexoate), hexane-1,6-diol di(3,5,5-trimethylhexoate), hexylene glycol di(2-ethylhexoate), heptane-1,7-diol diisomyristate, pentane-1,5-diol di(2-ethylbutyrate, di(2-methylvalerate) or di(2-ethylhexoate), propane-1,3-diol di(2-ethylhexoate), butane-1,4-diol di(4,6,6-trimethyl nonoate), octane-1,8-diol di(4-isopropylheptoate), and nonane-1,9-diol di(3,3-dimethyl-4-ethyl myristate).

The synthetic lubricating oils of this invention are best prepared by simply mixing the component esters in the required proportions. Generally it is not possible to make satisfactory oils by co-esterification of the two diol and two acid components since there is usually a wide variation in the reactivities of the components and a considerable proportion of the completely straight chain ester is formed, which tends to crystallize out of the mixture at a relatively high temperature.

Although the synthetic lubricating oils of the present invention are superior lubricants to the individual esters from which they are derived, nevertheless, for certain applications they require the addition of additives such as pour point depressors, viscosity index improvers, thickeners, anti-oxidants, anti-corrosive agents and anti-lacquering agents.

Very suitable additives which function as pour point depressors and viscosity index improvers in the present synthetic lubricating oils are polymers of esters of acrylic acid or a 2-alkylacrylic acid. The most suitable polymers have a relative molecular weight between 100 and 180 centistokes but polymers having a relative molecular weight as high as 400 centistokes are also useful. The expression "relative molecular weight" means the centistoke viscosity at 100° F. of a 30% by weight solution of the polymer in toluene. Typical esters, the polymers of which may be so employed, are the methyl, ethyl, n-propyl, isopropyl, isobutyl, lauryl, phenyl or benzyl esters of acrylic, methacrylic, 2-ethylacrylic and 2-propyl-acrylic acid. Typical suitable and commercially available polymers are those of $C_{8-12}$ alkyl methacrylates. The polymers may be homopolymers of a single ester or may be copolymers of a mixture of such esters and the term "polymer" as used herein is intended to be construed accordingly. The polymers may be used in the present synthetic lubricating oils to the extent or 2 to 30% by weight based on the total weight of the liquid esters and the polymers. Generally from 5 to 15% by weight is the most suitable proportion within the aforesaid range.

Polymers of acrylic acid esters and methacrylic acid esters suitable for use in the present synthetic lubricating oils are readily available as commercial products and are sold under the trade name "Acryloid." They are generally available as concentrated dispersions in a solvent and these concentrated dispersions can be used as such.

Some of the commercially available polymers suitable for use in the synthetic lubricating oils of the present invention are not shear stable and if such polymers are employed, it is desirable to subject them to a shearing action, for example, by passing them through an injector nozzle, before incorporating them in the lubricating oils. Alternatively, the polymers may be blended with one or more of the component esters of the present lubricating oils and subjected to such a shearing action before use.

Suitable anti-lacquering agents for addition to the present synthetic lubricating oils are the salts of aromatic carboxylic acids or of phenols with a metal of group II of the periodic table, which salts are soluble in the synthetic lubricating oil. These salts increase the oxidation and thermal stability of the synthetic lubricating oils under high temperature conditions of working and avoid the lacquering of bearings. Of the group II metals, zinc and calcium are the most suitable for the present purpose, but beryllium, magnesium, strontium, cadmium, barium or mercury salts may be used. The aromatic carboxylic acid or phenol chosen should have sufficient oleophilic properties to ensure that the metal salt employed is soluble in the liquid ester mixture. Preferably such salts are used in such amounts that there is a metal content in the finished lubricating oil of between 0.01 and 1.0% by weight. Normal or basic salts or mixtures of normal and basic salts may be employed. Suitable aromatic acids for use in the form of their group II metal salts in the present lubricating oils are benzoic acid, naphthoic acid, 4-tertiary-butyl benzoic acid, 2,4-ditertiary butylbenzoic acid, di-isopropylsalicylic acids, octylsalicylic acids, pentadecenylsalicylic acids, octadecylsalicylic acids, stearylsalicylic acids and octyl-4-hydroxybenzoic acids. The salts of the alkylated hydroxy benzoic acids are particularly useful and they may be used in admixture with one another. Thus there may be used salts of the mixtures of alkylated hydrobenzoic acids obtained by reacting salicylic acid or 4-hydroxybenzoic acid with a mixture of alkenes, such as a mixture obtained by the cracking of paraffin wax, or with a mixture of alcohols in the presence of a suitable condensing agent of the Friedel-Crafts type. Similarly salts of a mixture obtained by alkylating a phenol with such a mixture of alkenes or alcohols and converting the alkyl phenols produced into alkyl salicylic acids by the Kolbe Schmidt reaction may be used.

Suitable phenols for use in the form of their group II metal salts in the present lubricating oils are phenol itself, the naphthols, the cresols and the higher alkylated phenols, such as the amyl, octyl, nonyl, decyl, tetradecyl, pentadecenyl and octadecyl phenols. Salts or mixtures of alkyl phenols, for example, those made by the alkylation of a phenol with mixtures of alkenes, can be employed and are preferred on account of their lower melting points as compared with those of pure alkyl phenols. Mixtures of alkenes derived from paraffin wax by cracking or from higher fatty alcohols by dehydration are valuable and easily accessible starting materials for the manufacture of such mixtures of phenols. Thus, a mixture of alkyl phenols made by the alkylation of phenol or a cresol or 1- or 2-naphthol with a mixture of alkenes containing from 8 to 18 carbon atoms in the molecule and obtained by the above-mentioned procedure, can be employed. More than one alkyl or alkenyl group may be present in the phenol as in the case of compounds made by the di- or tri-alkylation of phenols with alkenes, alkyl halides, alcohols or ethers, or of compounds made by the monoalkylation of, for example, a cresol, a xylenol, carvacrol, or cardanol. Other nuclear substituents may be present provided that they do not unduly reduce the oil-solubility of the phenol. Thus, halogen, alkoxy, alkyl mercapto and alkyl amino groups may be present in the phenol.

Among the salts of phenols with group II metals, those derived from condensation products of certain hydrocarbon substituted phenols with formaldehyde or acetaldehyde are particularly effective. More particularly these condensation products are those produced from a hydrocarbon substituted phenol containing at least 4 carbon atoms in the substituent and capable of reacting with formaldehyde or acetaldehyde to give resinous condensation products, by reacting such phenol with formaldehyde or acetaldehyde or a polymer thereof, such as a para-formaldehyde. These condensation products may be converted into salts by reaction with basic compounds of group II metals or the salts may be prepared directly by carrying out the condensation reaction in the presence of a basic compound of a group II metal, preferably in the presence of an inert diluent.

A particularly useful salt for use in the present lubricating oils may be made as follows, the parts referred to being parts by weight:

Sixty parts of para-tert-octyl phenol are stirred into 260 parts of a solvent refined mineral lubricating oil containing 1 part of water, and 9.7 parts of calcium hydroxide and 10.1 parts of para-formaldehyde are added. The mixture is heated to 85° C., the temperature then raised to 95° C. over a period of 30 minutes and held at 95° C. for a further hour and then filtered hot to yield a concentrate having a calcium content of 1.2%.

Other effective metal salts for use in the lubricating oils of the present invention are the zinc salts of alkylated salicylic acids containing from 12 to 20 carbon atoms in the alkyl group. A particularly effective compound is the zinc salt of a mixture of alkyl salicylic acids made by alkylating phenol with a mixture of alkenes containing 14 to 18 carbon atoms in the molecule and converting the resulting alkyl phenols into the corresponding salicylic acids by the Kolbe Schmidt reaction.

Where high load carrying capacity is required an extreme pressure additive may be added to the synthetic lubricating oils of this invention. A good type of extreme pressure additive for the lubricating oils of this invention is the trialkyl, triaryl or trialkaryl phosphates, such as trioctyl or tricresyl phosphate. Extreme pressure agents of the halo-alkylphosphonate type, such as monobutyl hydrogen trichloromethyl-phosphonate and its amine salts, such as its salt with di(2-ethylhexyl)amine are also suitable.

Anti-oxidants, particularly of the phenolic type, may be added to the lubricating oils of this invention. Preferably such anti-oxidants are not volatile at the highest temperature pertaining under the conditions of use of the lubricating oil. The alkylated phenols and diphenols and phenothiazine and its alkyl substitution products are suitable anti-oxidants.

The following examples illustrate the invention.

Example 1

The component esters were as follows:

*Ester A.*—A mixture of esters made by esterifying 1 mole of a mixture of 2,2,4- and 2,4,4-trimethylhexane-1,6-diols with 2 moles of a mixture of straight chain fatty acids containing 8 to 13 carbon atoms in the molecule. This mixture of fatty acids was made by cracking paraffin wax, isolating a fraction of mixed olefins containing 9 to 14 carbon atoms in the molecule, sulfating the fraction to form the corresponding secondary alkyl hydrogen sulfates, hydrolyzing these to the corresponding secondary alcohols and fusing these alcohols with caustic alkali.

*Ester B.*—The ester made by esterifying 1 mole of hexane-1,6-diol with 2 moles of 3,5,5-trimethylhexoic acid.

Esters A and B were blended in the mole percentages set out in the table below, which table also sets out the properties of the resulting blends:

| Blend No. | Mole Percent, ester A | Mole Percent, ester B | Viscosity in centistokes at 100° F. | Viscosity in centistokes at 210° F. | Viscosity index (Dean and Davis) |
|---|---|---|---|---|---|
| 1 | 10 | 90 | 14.31 | 3.57 | 153 |
| 2 | 20 | 80 | 14.35 | 3.58 | 153 |
| 3 | 30 | 70 | 14.56 | 3.63 | 155 |
| 4 | 40 | 60 | 14.72 | 3.64 | 154 |
| 5 | 50 | 50 | 14.85 | 3.69 | 157 |

Moreover, all of the above blends had excellent low temperature properties. They remained liquid indefinitely at −60° C.

When, however, three further similar blends were made from Esters A and B but containing 70, 80 and 90 mole percent respectively of Ester A, the blends solidified at −60° C. or above.

Operation of an aircraft engine with any of the above compositions is successful at temperatures in the order of −65° C., while the use of either Ester A or Ester B alone is unsatisfactory. Ester A having a pour point in the order of −50° C., and Ester B having an extremely high viscosity at −65° C., thus resulting in poor motor efficiency and a high degree of wear.

Example II

An excellent synthetic lubricating oil was made by mixing 50 mole percent of a mixture of esters similar to Ester A of Example I, except that the fatty acids employed in making the ester contained 10 to 13 carbon atoms in the molecule, with 50 mole percent of Ester B described in Example I.

Other suitable compositions include the following:

Example III

| | Mole percent |
|---|---|
| 2,5-dimethyloctane-1,8-diol dimyristate | 60 |
| Ethylene glycol di(3,5,5-triethylhexoate) | 40 |

Example IV

| | Mole percent |
|---|---|
| 2,3,4-trimethylpentane-1,5-diol dipelargonate | 25 |
| Pentane-1,5-diol di(4,6,6-trimethyloctoate) | 75 |

Example V

| | Mole percent |
|---|---|
| 2-propylnonane-1,9-diol dibutyrate | 50 |
| Heptane-1,7-diol di(3-isopropylheptoate) | 50 |

Example VI

| | Mole percent |
|---|---|
| 3,3,4-triethylpentane-1,5-diol dinonoate | 65 |
| Pentane-1,5-diol di(2-ethylbutyrate) | 35 |

Example VII

| | Mole percent |
|---|---|
| 2-butylbutane-1,4-diol dilaurate | 5 |
| Hexane-1,6-diol di(di-3-ethylhexoate) | 95 |

We claim as our invention:

1. A lubricating composition consisting essentially of a mixture of liquid esters, one of which is a diester of a branched chain alkane primary diol having from 4 to 18 carbon atoms per molecule with a straight chain saturated fatty acid having from 4 to 18 carbon atoms per molecule, and the other of which is a diester of a straight chain alkane di-primary diol having from 3 to 12 carbon atoms per molecule with a branched chain saturated fatty acid having from 4 to 18 carbon atoms per molecule, the mol ratio of the first diester to the second diester being between 65:35 and 2:98.

2. A lubricating composition comprising as the sole lubricating component thereof a mixture of liquid esters, one of which is a diester of a trialkylalkane primary diol having from 4 to 18 carbon atoms per molecule with a straight chain saturated fatty acid having from 4 to 18 carbon atoms per molecule, and the other of which is a diester of a saturated straight chain alkane di-primary diol having from 3 to 12 carbon atoms per molecule with a trialkylalkane monocarboxylic acid having from 4 to 18 carbon atoms per molecule, the mole ratio of the first diester to the second diester being between 65:35 and 2:98.

3. A lubricating composition consisting essentially of a mixture of liquid esters, one of which is a diester of a dialkylalkane primary diol having from 4 to 18 carbon atoms per molecule with a straight chain saturated fatty acid having from 4 to 18 carbon atoms per molecule, and the other of which is a diester of a saturated straight chain alkane di-primary diol having from 3 to 12 carbon atoms per molecule with a dialkylalkane monocarboxylic acid having from 4 to 18 carbon atoms per molecule, the mol ratio of the first diester to the second diester being between 65:35 and 2:98.

4. A lubricating composition comprising as the sole lubricating component thereof a mixture of liquid esters, one of which is a diester of a polyalkylalkane primary diol having from 4 to 18 carbon atoms per molecule with a straight chain saturated fatty acid having from 4 to 18 carbon atoms per molecule, and the other of which is a diester of a saturated straight chain alkane di-primary diol having from 3 to 12 carbon atoms per molecule with a polyalkylalkane monocarboxylic acid having from 4 to 18 carbon atoms per molecule, the mole ratio of the first diester to the second diester being between 65:35 and 2:98.

5. A lubricating composition consisting essentially of a mixture of liquid esters, one of which is a diester of a polyalkylalkane primary diol having from 8 to 13 carbon atoms per molecule with a straight chain saturated fatty acid having from 8 to 13 carbon atoms per molecule, and the other of which is a diester of a saturated straight chain alkane di-primary diol having from 5 to 10 carbon atoms per molecule with a polyalkylalkane monocarboxylic acid having from 8 to 16 carbon atoms per molecule, the mol ratio of the first diester to the second diester being between 1:1 and 1:4.

6. A lubricating composition comprising, as the sole lubricating component thereof, a mixture of n-hexane-1,6-diol-di(3,5,5-trimethylhexoate) and the mixed diesters formed between a mixture of 2,4,4-trimethylhexane-1,6-diol and 2,2,4-trimethylhexane-1,6-diol and a mixture of straight chain saturated fatty acids having between 8 and 13 carbon atoms per molecule, the mol ratio of the first diester to the mixed diesters being between about 1:1 and 1:4.

7. A lubricating composition consisting essentially of a mixture of (A) n-hexane-1,6-di(trimethylhexoate) and (B) formed between at least one trimethylhexane-1,6-diol and at least one straight chain fatty acid having from about 8 to about 13 carbon atoms per molecule, the mol ratio of A to B being between about 1:1 and about 1:4.

References Cited in the file of this patent

UNITED STATES PATENTS

| 2,603,604 | Ballard | July 15, 1952 |
| 2,691,663 | Smith | Oct. 12, 1955 |

OTHER REFERENCES

Ind. and Eng. Chem., vol. 45, No. 8, pages 1770, 1771 and 1772.

Ind. and Eng. Chem., vol. 39, No. 4, pages 484, 485, 488 and 489.